United States Patent Office 3,649,455
Patented Mar. 14, 1972

3,649,455
PRODUCTION OF LIPASE
Jinnosuke Abe, Tagata-gun, Tetsuo Watanabe, Yokohama-shi, and Kango Miyauchi, Tsutomu Yamaguchi, Toshiharu Nito, and Noriyuki Muroya, Tagata-gun, Japan, assignors to Toyo Jozo Kabushiki Kaisha, Shizuoka-ken, Japan
No Drawing. Filed July 2, 1969, Ser. No. 838,658
Claims priority, application Japan, July 2, 1968, 43/45,608
Int. Cl. C07g 7/028
U.S. Cl. 195—66 R    5 Claims ABSTRACT OF THE DISCLOSURE
A process for the production of enzyme lipase, in which a microorganism of genus Chromobacterium is cultivated in a culture medium containing a source of assimilable carbon and nitrogen, and the enzyme produced is then separated from the cultured medium. The enzyme lipase thus produced is characterized by good stability and activity. A new microorganism is useful in this process, namely, *Chromobacterium viscosum* var. *paralipolyticum* KO HATSU KEN KIN KI No. 137 of the Fermentation Research Institute of Japan.

---

The present invention relates to the production of enzyme lipase, by a novel method in which known microorganisms may be employed. The invention also relates to the enzyme lipase of enhanced stability and activity which is thus produced, as well as a novel microrganism useful in the process.

It has been hitherto reported that there were a large number of lipase-producing microorganisms such as genus Aspergillus, genus Penicillium, genus Rhizopus, genus Mucor, genus Absidia, genus Candida, genus Torulopsis, genus Brettanomyces, genus Bacillus, genus Streptococcus, genus Pseudomonus, genus Clostridium, genus Sclerotinia or the like. However, no report was known of the production of lipase by a genus Chromobacterium.

The inventors of the present invention have been investigating and screening lipase-producing microorganisms using animal or vegetable fat, especially emulsions of lard, as a substrate, and have found that a Gram-negative bacillus, separated from muddy river soil samples from Numazu-shi, Shizuoka-ken, Japan, produced strong and stable enzyme lipase.

It is a principal object of the present invention to provide a process for the production of stable and potent enzyme lipase.

It is another object of the present invention to provide an industrially advantageous process for the production of the said lipase by using a hitherto unknown microorganism as a lipase producer.

Still another object of the present invention is the provision of enzyme lipase produced by this process and characterized by enhanced stability and activity.

It is also an object of the present invention to provide a novel microorganism useful in this process.

These and other objects, features and advantages of the present invention will become more apparent to any person skilled in the art upon reading the more detailed description set forth hereinbelow.

The novel microorganism described hereinabove has the following taxonomical properties.

(A) Growth Condition
  (1) Microscopical observation
    Size: 0.6–1.2μ
    Form: short rod
    Motility: weak
    Spore: no sporulation
  (2) Characteristics of colony
    Surface: round, convex, lustrous and viscous
    Color: pale yellowish brown
    Pigment: not formed
    Test medium:
      (a) mannitol yeast extract agar medium
      (b) glucose peptone medium
      (c) nutrient agar medium
      (d) potato extract agar medium
  (3) Growth conditions in several media
    Bouillon: growth
    Bouillon agar medium: growth
    Glucose bouillon agar medium: good growth
    Gelatin medium: growth
    Aqua peptone: growth
    Potato medium: growth
    Litmus milk: growth, acid formation
(B) Physiological Properties
  (1) Optimum growth condition
    pH: 6.5
    Temperature: 26° C.
    Aerobic or anaerobic: aerobic
  (2) Growth condition
    pH: 5.5–9.0
    Temperature: 5–37° C.
    Aerobic or anaerobic: areobic

| | |
|---|---|
| (3) Gram's stain | − |
| (4) Acid-fastness | − |
| (5) Methyl red test | − |
| (6) Voges-Proskauer's reaction | − |
| (7) Indole formation | − |
| (8) Hydrogen sulfate formation | − |
| (9) Ammonia formation | + |
| (10) Nitrate reduction | + |
| (11) Catalase formation | + |
| (12) Gelatin liquefaction | + |
| (13) Casein liquefaction | ± |
| (14) Starch hydrolysis | − |
| (15) Utilization of citrate | + |
| (16) Coagulation of milk | − |
| (17) Litmus reduction | + |
| (18) Methylene blue reduction | − |
| (19) Utilization of ammonia salt and urea | − |

(C) Utilization of Carbon Sources

| | |
|---|---|
| Arabinose | + |
| Xylose | − |
| Glucose | + |
| Mannose | + |
| Fructose | + |
| Raffinose | − |
| Sorbitol | − |
| Inositol | − |
| Glycerol | − |
| Salicin | − |
| Galactose | + |
| Lactose | − |
| Maltose | − |
| Sucrose | + |
| Trehalose | + |
| Inulin | − |
| Dextrin | − |
| Starch | − |
| Cellulose | − |

Examining the taxonomical situation of the microorganism having the said taxonomical properties with reference to "Manual for the Identification of Medical Bacteria," by S. T. Cowan and K. J. Steel, Cambridge Univ. Press, 1965, in respect of negativity to Gram's stain, rod shape, motility, aerobic nature, positive catalase formation, negative oxidase formation and oxidative decomposition of sugar, the said strain evidently belongs to the genus Chromobacterium.

By comparison of the taxonomical properties of this Chromobacterium and those of the type cultures belonging to the genus Chromobacterium obtained from the American Type Culture Collection, this lipase-producing strain is identified as a bacterium *Chromobacterium viscosum.*

The following table illustrates the characteristic differences between the said microorganism of this invention and *Chromobacterium viscosum* ATCC 6918.

|  | This strain | Chromobacterium viscosum ATCC 6918 |
|---|---|---|
| Liquefaction of casein | ± | + |
| Utilization of citrate | + | − |
| Utilization of arabinose | + | − |
| Utilization of lactose | − | + |
| Utilization of raffinose | − | + |
| Utilization of sorbitol | − | + |
| Utilization of dextrin | − | + |

These two strains, however, resemble each other remarkably in many other taxonomical properties such as characteristics on many media and physiological properties. Therefore these strains are not strongly differentiated as different species of Chromobacterium. Accordingly, this lipase-producing strain is herein referred to as *Chromobacterium viscosum* var. *paralipolyticum,* and has been deposited at Fermentation Research Institute, Agency of Industrial Science & Technology, Ministry of International Trade & Industry, Japan, and added to its permanent culture collection, as a deposit number KO HATSU KEN KIN KI No. 137. This strain has also been deposited at the Northern Utilization Research and Development Division of the Agricultural Research Service of the United States Department of Agriculture, at Peoria, Ill., where it has been added to the permanent collection of microorganisms and has been assigned the numerical designation NRRL B-3673 and is available as of the filing date of this application.

The inventors of the present invention also found that *Chromobacterium viscosum* ATCC 6918 and *Chromobacterium violaceum* ATCC 12472 were able to produce enzyme lipase.

The above-described *Chromobacterium viscosum* var. *paralipolyticum* is only illustrative as one of the microorganisms usable in this invention, and the present invention also contemplates the use of other lipase-producing strains belonging to genus Chromobacterium.

According to this invention, lipase is produced by inoculating a suitable nutrient medium with lipase-producing Chromobacterium for example *Chromobacterium viscosum* var. *paralipolyticum.*

Nutrient media which are useful for the production of lipase may include an assimilable source of carbon such as glucose, sucrose, lactose, maltose, soluble starch, starch, dextrin, molasses etc.; an assimilable source of nitrogen such as soy bean powder, defatted soy bean powder, cotton seed powder, peptone, meat extract, yeast extract, powdered dry yeast, corn steep liquor, casein hydrolysate, urea, ammonium salt etc. The media further include salts such as phosphates, namely magnesium phosphate, calcium phosphate, potassium phosphate and the like.

Also various organic or inorganic materials useful for promoting microorganism growth or enzyme production may generally be added to medium.

The inventors of the present invention have also found that lipase production is increased when lipase-producing microorganisms belonging to genus Chromobacterium are cultured in a medium containing oils and fats. Therefore this invention includes the process for the production of lipase which comprises culturing the lipase-producing microorganism belonging to genus Chromobacterium in a medium containing oils and fats, and isolating the enzyme lipase therefrom.

Oils and fats which may be added to the medium of this invention are animal fats and oils such as lard oil, beef fat, butter, whale oil, fish oil or vegetable oil such as olive oil, soy bean oil, cotton seed oil, sesame oil, rape seed oil, peanut oil, coconut oil and the like. These fats and oils may be added in a suitable amount preferably about 0.5 to 5 percent by volume of the medium. Solid fats such as lard oil, beef fat or butter are easy to suspend in the medium by steam sterilization, and therefore may be utilized by the lipase-producing microorganism.

The cultivation of the microorganism in this invention can be carried out in a number of different ways such as liquid culture or solid culture. The most profitable way for industrial production is a submerged aeration culture process.

For carrying out the culture of the organism for the production of lipase by this invention, the culturing temperature may be selected generally in the range of temperature in which the lipase-producing microorganism can grow and the lipase can be produced, preferably at 24–28° C.

The culturing period, although variable in accordance with the conditions employed, is generally 2 to 6 days; and at the time when the culture broth reaches maximum potency in lipase, the cultivation should naturally be terminated.

It is unnecessary to control the pH of the medium as this remains almost constant; however, it is preferable to adjust to pH 6–7 at the time of medium preparation.

The isolation of lipase from the cultured medium may be conducted according to the usual processes for the separation and purification of the enzyme lipase. In the case of solid culture, water extraction or the like procedure as known in the prior are is employed to obtain an extracted liquor. In the case of liquid culture according to a preferred procedure employing vacuum filtration, centrifugation or the like prior processes, the beer is filtered to separate mycelia and obtain a filtrate.

To these extracts or filtrates with or without concentration, a soluble salt such as common salt, ammonium sulfate or the like, or a water-miscible organic solvent such as ethanol, acetone or the like is added to precipitate the lipase. Alternatively, the filtrate is spray-dried with the addition of a subsidiary stabilizer such as malt dextrine, lactose, carboxy methyl cellulose, polyethylene glycol, skim milk, casein, sorbitol or the like. In still other processes, lyophilization, absorption on an ion exchange resin, gel filtration or the like may be employed.

These isolation and purification procedures may be alternatively or combinatively employed, thereby obtaining an enzyme powder having lipase activity.

The thus obtained lipase prepared by the process of this invention is extremely stable and active. Therefore, the enzyme lipase may be applied for a wide range of uses such as digestives, cleaning agents, agents for sewage disposal facilities and the like.

The comparison of the decomposition ratio of the crude lipase powder obtained in accordance with the alcohol precipitation procedure as set forth hereinbefore is shown in Table 1 (decomposition ratio of olive oil is set to 1.0).

TABLE 1

| Substrate: | Decomposition ratio |
|---|---|
| Olive oil | 1.0 |
| Cotton seed oil | 0.90 |
| Sesame seed oil | 0.86 |
| Soy bean oil | 2.20 |
| Peanut oil | 0.90 |
| Rape seed oil | 0.90 |
| Lard oil | 2.0 |
| Beef fat | 1.2 |
| Butter | 1.2 |
| "Tween 60" | 0.50 |

Assay method—Preparation: water 24 volumes, substrate 1 volume, lipase powder 37.5 mg. for 1 g. of substrate.

Incubated at pH 7.0 and 30° C. for 10 hours.

The lipase of the process of the present invention is inhibited by metal ion as shown in the following Table 2.

TABLE 2

| Metal ion ($10^{-3}$ g. ion/l.): | Inhibition, percent |
|---|---|
| $Fe^{++}$, $Fe^{+++}$, $K^+$, $Na^+$, $Pb^{++}$, $Co^{++}$, $Mn^{++}$, $Sn^{++}$, $Sn^{+++}$, $Ba^{++}$, $Ca^{++}$ | Below 10. |
| $Zn^{++}$, $Al^{+++}$, $Ni^{++}$, $Mg^{++}$ | 10 to 20. |
| $Cu^+$, $Cu^{++}$, $Hg^{++}$ | More than 20. |

The following examples only illustrate the process of the present invention and are not to be construed as limiting.

Example 1

One hundred milliliters of an aqueous medium (pH 6.5) consisting of lard oil 2%, starch 2%, defatted soy bean powder 2%, ammonium sulfate 0.3%, $KH_2PO_4$ 0.2%, $CaCO_3$ 0.5% and $MgSO_4 \cdot 7H_2O$ 0.1% were introduced into a 500-milliliter Erlenmeyer flask, sterilized at 120° C. for 20 minutes, inoculated with *Chromobacterium viscosum* var. *paralipolyticum* and then with rotary shaking cultured at 300 r.p.m. at 20° C. for 4 days, obtaining 75 ml. of cultured filtrate containing 11.5 units/ml. of lipase according to the following assay method, using a lard oil as a substrate:

(A) Reaction mixture
  Enzyme solution—1 ml.
  pH 7.0, 0.1 M phosphate buffer—5 ml.
  Lard oil emulsion—10 ml.

Lard oil emulsion as above is prepared by homogenizing a mixture of 20 g. of melted lard oil, 10 ml. of "Tween 60" and 70 ml. of water, at 11,000 r.p.m. for 10 minutes.

(B) Procedure

The reaction mixture, in an L-type tube, is shaken with a Monod's shaker at 40° C. for 60 minutes, thereafter the emulsion is broken by quickly adding 30 ml. of a mixture of ethanol-acetone (1:1), then titrating with 0.05-N NaOH in the presence of phenolphthalein as an indicator. As a control, denatured enzyme heated at 100° C. for 10 minutes is used. The potency is shown by the number of ml. of the remaining balance between the control and the titration ml. hereinabove (i.e. 1 ml. indicates 1 unit).

To the filtered broth ethanol was added up to 75% of alcohol concentration yielding 3.43 g. of crude lipase powder.

The potency of this enzyme powder was 198 units/g. according to the above assay method.

The thus yielded crude lipase powder revealed trace protease activity other than a strong lipase activity; and α-amylase, β-amylase- and lipoproteinlipase-activity etc. were not detected.

The crude lipase powder obtained has the following properties:

Stability on various pH at 20° C. for 24 hours: more than 80% as remaining activity at a range of pH 4.0–9.0; more than 70% at pH 3–10.

Optimum pH: active at a wide range of pH 4.0–9.0, maximum activity at pH 6–7; activity ratio at pH 6=100; pH 4=80; pH 9=80; pH 10=70; pH 3=40.

Heat stability after heating at 37–95° C. for 10 minutes: 90% as remaining activity at a temperature lower than 80° C.; 60% at 90° C.

Optimum temperature: about 50° C.

Example 2

Example 1 was repeated, but the lard oil in the aqueous medium was omitted, to obtain 26 g. of crude lipase powder having 15 units/g.

Example 3

Example 1 was repeated, but the lard oil was replaced by olive oil, to obtain 3.01 g. of crude lipase powder. Activity of the enzyme powder was 109 units/g. according to the following assay method using olive oil as a substrate:

(A) Reaction mixture
  Enzyme solution—1 ml.
  pH 7.0, 0.1 M phosphate buffer—5 ml.
  Olive oil emulsion—10 ml.

Olive oil emulsion as above is prepared by homogenizing a mixture of 80 ml. of 2% aqueous solution of polyvinylalcohol and 20 ml. of Japanese pharmacopoeial olive oil at 5–10° C. for 10 minutes at 11,000 r.p.m.

(B) Procedure

Reaction is carried out at 37° C. for 50 minutes, thereafter the emulsion is broken by quickly adding 30 ml. of a mixture of ethanol-acetone (1:1), then titrating with 0.05-N NaOH in the presence of phenolphthalein as an indicator. As a control, denatured enzyme heated at 100° C. for 10 minutes is used. The potency is shown by the number of ml. of the remaining balance between the control and the titration ml. hereinabove (i.e. 1 ml. indicates 1 unit).

Example 4

Example 1 was repeated, but the lard oil was replaced by soy bean oil to obtain 3.32 g. of crude lipase powder. Potency of this enzyme powder in accordance with the assay method of Example 3 was 100 units/g.

Example 5

Twenty liters of aqueous medium (pH 6.5) consisting of lard oil 2%, starch 2%, defatted soy bean powder 2%, ammonium sulfate 0.3%, $KH_2PO_4$ 0.2%, $CaCO_3$ 0.5%, $MgSO_4.7H_2O$ 0.1% and antifoaming agent 5 ml. (Disfoam CA 220; Nippon Oils and Fats Co., Ltd., Tokyo) were introduced into a 30 l. jar fermenter, and sterilized at 120° C. for 30 minutes.

One liter of cultured medium of *Chromobacterium viscosum* var. *paralipolyticum*, which was cultured in the same medium at 26° C. for 2 days, was inoculated thereto, and cultured at 26° C. for 2 days with aeration 20 l./min., agitation 300 r.p.m., to obtain a cultured broth having 8.3 units/ml. of lipase activity. The broth was introduced into 400 l. of sterilized aqueous medium consisting of the same medium hereinabove in a stainless steel fermentation tank (100 ml. of antifoaming agent was added), and cultured at 26° C. for 4 days with aeration 400 l./min., agitation 300 r.p.m. to obtain 265 l. of the cultured broth after twice centrifuging in a Sharples-type centrifuge.

The potency of the broth according to the assay method of Example 1 was 13.0 units/ml.

Further, this filtrate was concentrated to 125 l. by jet-concentration (evaporation 25 l./hr., temp. 30° C.). The thus obtained concentrate was spray dried at an inlet temperature of 120° C. and an outlet temperature of 70° C., to yield 8.1 kg. of crude lipase powder, having an activity of 251 units/g. according to the same assay method.

Example 6

Twenty liters of liquid medium (pH 6.5) consisting of lard oil 2%, starch 2%, defatted soy bean powder 2%, ammonium sulfate 0.3%, $KH_2PO_4$ 0.2%, $CaCO_3$ 0.5%, $MgSO_4.7H_2O$ 0.1% and antifoaming agent 5 mil. were introduced into a 30-liter jar fermenter. After sterilization at 120° C. for 30 minutes, one liter of aqueous culture of *Chromobacterium viscosum* var. *paralipolyticum* fermented for 2 days at 26° C. in the same medium was inoculated therein, and cultured for 4 days at 26° C., with the condition of aeration 20 l./min., agitation 300 r.p.m. The mycelia was filtered off to yield 14.8 l. of filtrate, which had a lipase activity of 11.4 units/ml. in accordance with the assay method of Example 1.

Four hundred ninety g. of maltdextrin was added to the filtrate, which was thereafter spray dried at inlet temperature 120° C. and outlet temperature 70° C. to yield 927 g. of crude lipase powder. The activity of the said enzyme powder was 126 units/g. according to the assay method hereinabove.

Example 7

Example 6 was repeated, but the lard oil was replaced by olive oil to yield 15.6 l. of cultured broth having a potency of 5.9 units/ml. in accordance with the assay method of Example 3.

The said cultured broth was concentrated by using a jet-concentration apparatus at 30° C., evaporation rate 25 l./hr. to obtain 7.5 l. of concentrate (lipase activity: 11.0 units/ml.) Ethanol was added up to 75% concentration therein to yield 495 g. of crude lipase powder. The activity of the said enzyme powder was 107 units/ml. in accordance with the same assay method hereinabove.

Example 8

Acetone was dropwise added to 80 ml. of the cultured filtrate according to the same culturing procedure as described in Example 1 (lipase activity 11.0 units/ml. assayed by the method of Example 1 hereinbefore) at 5° C. up to 30% of acetone concentration, to isolate a precipitate by centrifugation at 9000 r.p.m. The residual supernatant was treated by the same procedure hereinabove to isolate the precipitates at 60% and 80% concentration of acetone respectively.

The precipitates isolated at 30%, 60% and 80% concentration of acetone were washed each with 30%, 60% and 80% concentration of acetone respectively, and each washing solution was separately discarded.

The same procedures were repeated again and the precipitates were dried in vacuo.

The activity and yield of dried lipase powder obtained hereinabove were as follows:

| Acetone concentration (percent) | Lipase activity (unit/g.) | Yield (g.) |
|---|---|---|
| 30 | 15 | 1.03 |
| 60 | 60 | 0.70 |
| 80 | 1,530 | 0.31 |

Example 9

Example 1 was repeated, but the *Chromobacterium viscosum* var. *paralipolyticum* was replaced by *Chromobacterium viscosium* ATCC 6918 and then *Chromobacterium violaceum* ATCC 12472 to result as follows:

| | Crude lipase powder | |
|---|---|---|
| | Yield, g. | Potency, units/g. |
| *Chromobactierium viscosum* ATCC 6918 | 1.3 | 38 |
| *Chromobactierium violaceum* ATCC 12472 | 1.5 | 35 |

Having described our invention, we claim:

1. A process for the production of enzyme lipase, comprising culturing a microorganism of the genus Chromobacterium in a culture medium containing a source of assimilable carbon and nitrogen, and separating said lipase thus produced from the cultured medium.

2. A process as claimed in claim 1, in which the culture medium contains oils and fats.

3. A process as claimed in claim 1, in which the microorganism is a strain selected from the group consisting of *Chromobacterium viscosum* var. *paralipolyticum* KO HATSU KEN KIN KI No. 137, *Chromobacterium viscosum* ATCC 6918 and *Chromobacterium violaceum* ATCC 12472.

4. A process as claimed in claim 1, and culturing the microorganism at 24–28° C. for 2–6 days.

5. A process as claimed in claim 1, in which said separation is effected by precipitation, absorption and spray drying.

References Cited

UNITED STATES PATENTS 2,480,090  8/1949  Smythe et al. _____ 195—66
3,189,529  6/1965  Yamada et al. _____ 195—66 X A. LOUIS MONACELL, Primary Examiner D. M. NAFF, Assistant Examiner U.S. Cl. X.R.

195—62